Figure 4:
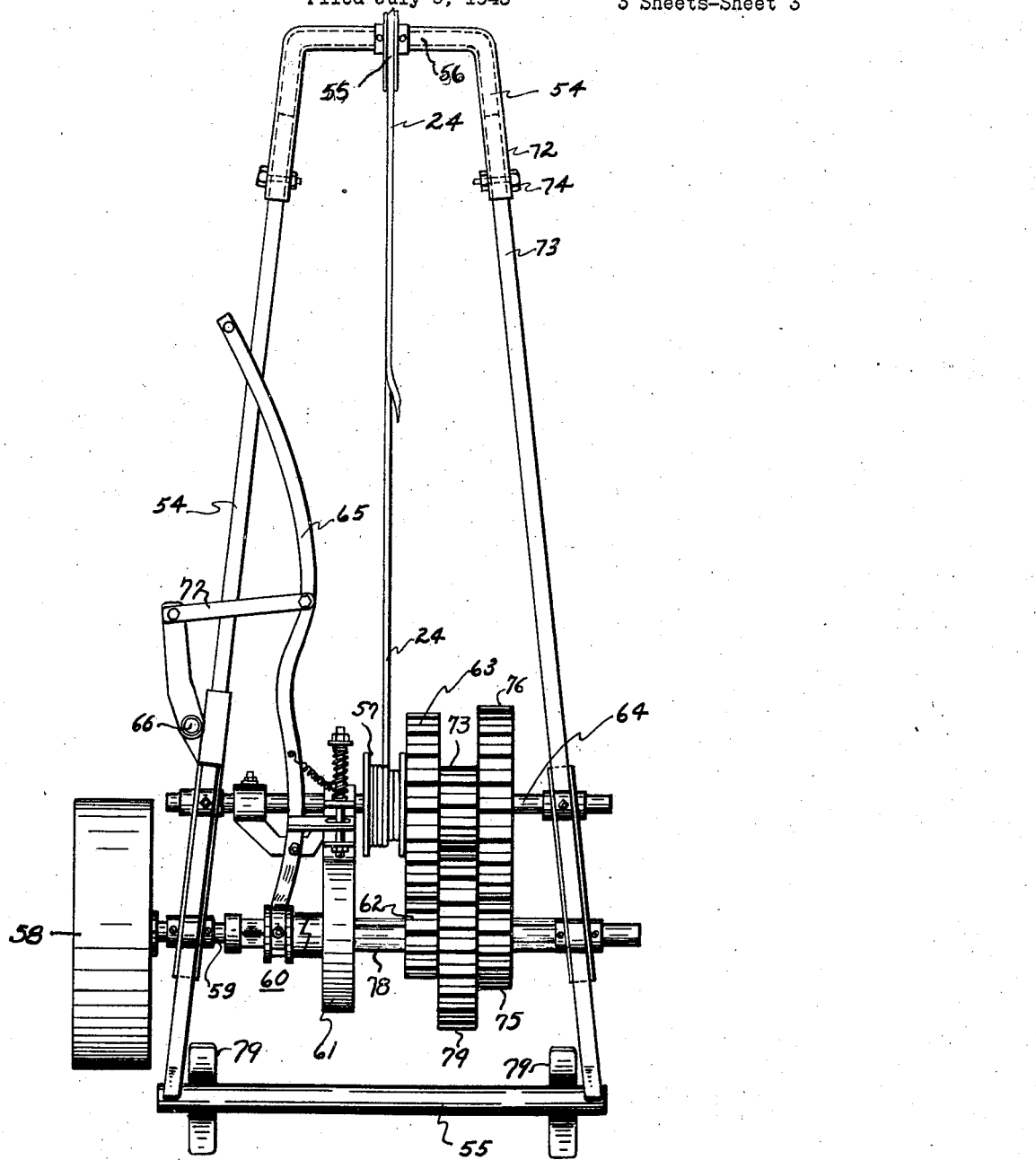

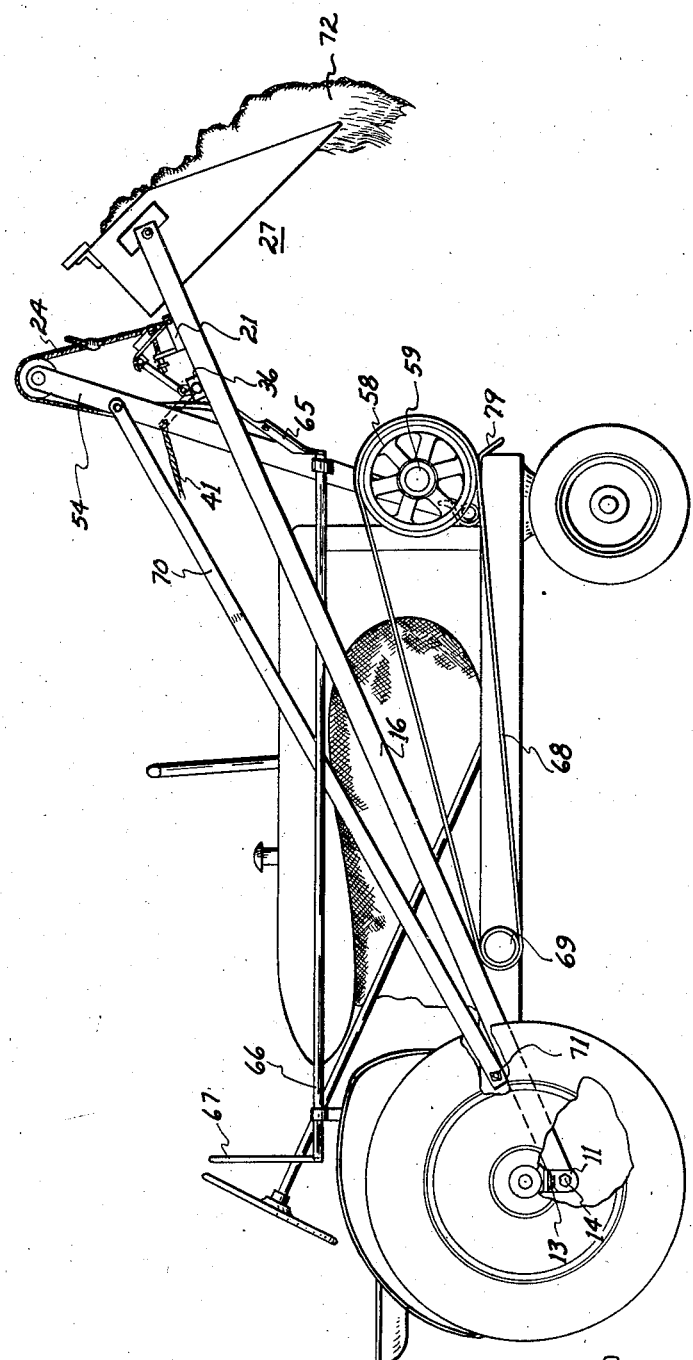

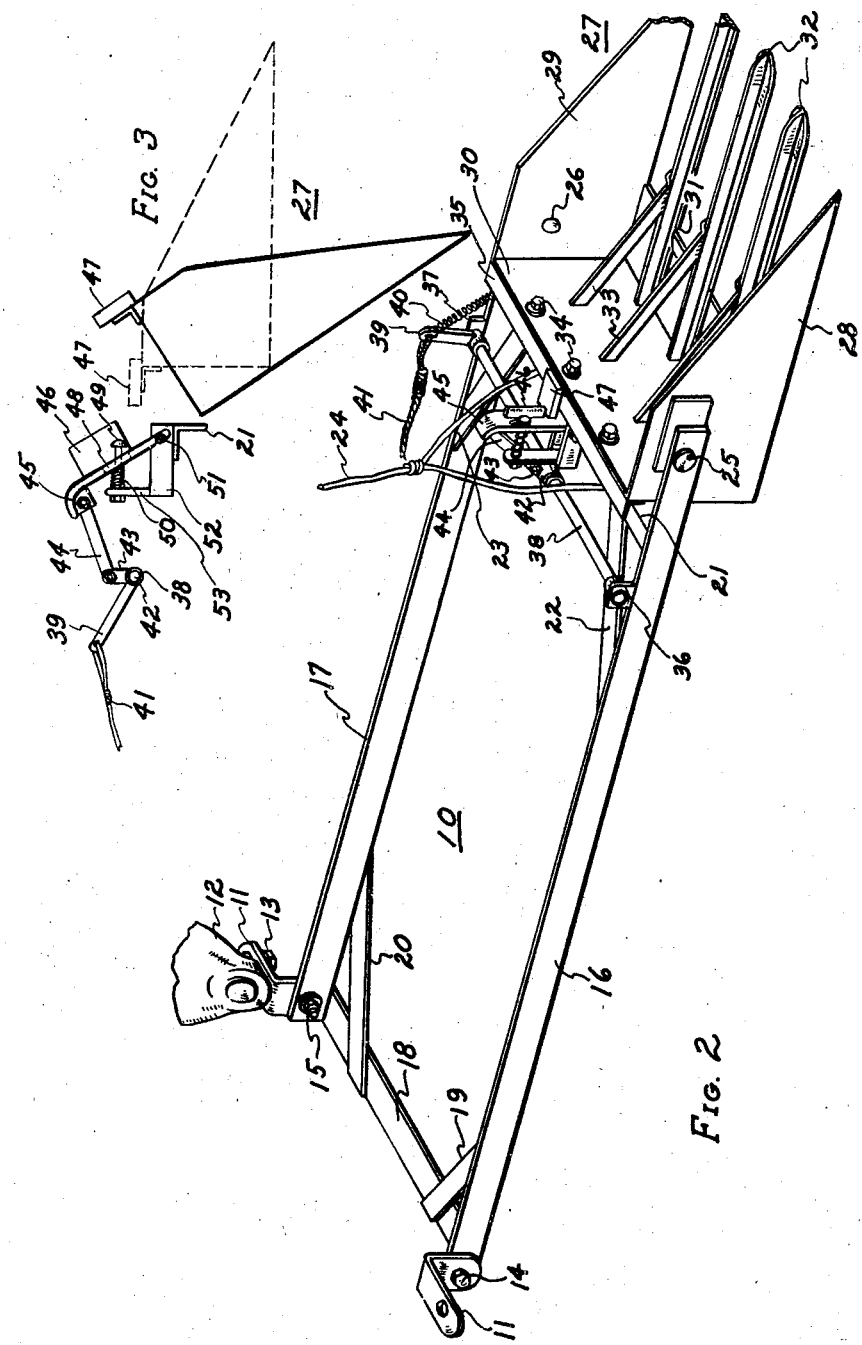

INVENTOR.
ROBERT T. MOUDY
BY Benedict & Swartwood
ATTORNEYS

Patented Oct. 28, 1947

2,429,890

UNITED STATES PATENT OFFICE 2,429,890

MATERIAL LOADER

Robert T. Moudy, Covington, Ind., assignor, by mesne assignments, of one-third to McEnglevan Heat Treating and Manufacturing Company, Inc., Danville, Ill., a corporation of Illinois Application July 9, 1945, Serial No. 603,763

3 Claims. (Cl. 214—140)

This invention relates to a material loader which may be attached to farm tractors and is useful for moving sand, gravel, dirt, manure and other materials around farms, etc.

More particularly it relates to a combination hoist and material bucket which may be attached and removed from farm tractors quickly and easily by one man.

The problem of moving various types of material, particularly loading it on trucks, wagons, etc., around farms, stock yards and the like is of particular importance because the mechanization of farm equipment has been increasing greatly during recent years. The need for an appliance which can be handled by one man is important because of the trend of farm operations. By this invention the operator is able to manipulate the apparatus from the tractor seat to move comparatively heavy loads ranging from several hundred pounds to approximately two tons. Various devices have been suggested for this, many of them using the hydraulic principle. Some use cable and pulley arrangements but are subject to various disadvantages such as the need for guides, telescoping apparatus, and special mounts for attaching to the tractor.

In one specific embodiment, this invention comprises a frame pivotally attachable beneath the rear axle of a tractor, said frame having a material bucket pivotally attached at the forward end, the point of attachment being forward and above the center of gravity of the bucket so as normally to assume the loading position, and such that when the device is in loading position, the frame is substantially parallel with the ground, a trip arranged to hold the bucket in the normal loading position, means for operating the trip, a boom removably associated with the front end of a tractor frame at an angle of less than 90° and extending above the tractor, said boom having braces from an intermediate point thereon rigidly attachable to the tractor rearward of the boom, hoisting means operatively associatable with the pulley drive of the tractor, said hoisting means including a brake, a clutch, and a drum for winding a cable, one end of said cable being associated with the front end of the first mentioned frame to raise and lower it, and means for operating said clutch and brake.

The invention may be further understood by reference to the accompanying drawings of which Figure 1 is a side view partly in section of the assembly as associated with a tractor. Figure 2 is a perspective view of the frame and material bucket showing the device in loading position.

Figure 3 is an elevation of the bucket and trip arrangement when in position for dumping. Figure 4 is a front view of the boom showing an arrangement of a pulley drive, clutch, brake and drum whereby the bucket may be raised and lowered.

Referring to Figure 1, the apparatus is shown as associated with a tractor, the particular type being an Allis-Chalmers. With minor modifications, the apparatus is applicable to the other makes of tractor. The bucket is shown in elevated position at the instant at which it is being dumped. For purposes of simplification, the gearing system is not illustrated in Figure 1.

The frame 10 is pivotally attached beneath the rear axle of the tractor by means of a hanger 11 which is bolted on to the axle housing 12 by means of a bolt 13.

A pivot pin 14 extends through the hanger and rear portion of the frame and may be held in place by a nut 15 or by means of a cotter pin or other suitable arrangement. This connection should be such that the frame may be raised and lowered pivoting about this point but must be sufficiently close so that there is no longitudinal play which would tend to shear the pin 14. The frame 10 comprises two sides 16 and 17 which may be made of pipe, angle iron, channel iron or other suitable structural material. For purposes of simplifying the drawings, it is illustrated merely as a flat structure but it should be understood that this is not the most desirable form. In general, pipe is preferred since it permits a lighter, stronger structure. If pipe is used, it can be flattened and drilled at the end where the pins are pivoted to hanger 11 or a suitable fitting can be threaded or welded to the end of the pipe to make this connection. Extending between the rear ends of sides 16 and 17 is an end member 18 which may be welded or otherwise joined to the two side pieces. Extending from member 18 to the side members are braces 19 and 20 which serve to stiffen and strengthen the frame. The position of these is such as to permit full elevation of the bucket without interfering with the tractor structure.

Near the front of the frame, just behind the bucket and arranged so as to prevent the bucket tilting backward, as will be explained, is a front cross-member 21. Extending from member 21 to the side members are braces 22 and 23 which also serve to stiffen the frame 10. These pieces may be made of strap iron, angle iron, channel iron, pipe or the like. Attached to the front cross-member 21 by any suitable means such as holes, eyebolts, etc. is a cable 24. This is shown as attached to two points, one on each side of and equidistant from the center of the cross member 21. Near the end of each side member 16 and 17 is a pivot 25 and 26 which extends through a hole in the side members and permits the bucket, generally indicated as 27, to pivot in a forward direction. The bucket is comprised of sides 28 and 29, a back 30 and a partial solid bottom 31. The sides and back are shown as solid sheet but for some purposes may be of pipe, straps or the like. Teeth 32 of which there may be several, extend forwardly from the back of the bucket. These may be made of angle iron, pipe rods but are preferably T-iron. Braces 33 extend from the back 30 of the bucket to a point about midway of the teeth. In certain instances, braces are not used for every tooth. The sides and back and bottom 31 of the bucket may be of sheet iron or other suitable metal.

The bucket structure may be modified somewhat but in general, it is desirable to have the bottom piece 31 to stiffen the structure. It is also within the scope of the invention to removably associate a solid bottom with the bucket so that different types of material may be handled.

At the top and rear of the bucket attached to the back 30 by bolts 34 or may be welded to the back 30 is an angle iron 35. This extends rearward of the back of the bucket sufficiently so that it overlaps the cross-member 21 and when the bucket is in position for loading, angle 35 bears on cross-member 21 thus preventing the front of the bucket from being tilted upward. By properly adjusting the position of angle 35 the bottom of the bucket can be adjusted to the correct angle for the most efficient loading. In general the position is such that the teeth are maintained in a position approximately parallel to member 16 and 17 which means that they are approximately parallel to the surface of the earth when resting thereon. The angle should be less than 5° out of parallel with the ground and preferably no more than about 1–3° tilt downward from back to front when resting on the ground. This prevents the bucket from being pushed upward as it is thrust into the material to be moved. For example, on certain tractors the frame is about 134 inches long, the frame will be parallel with the ground when the bucket is raised about 2–4 inches. The angle of tilt should not be more than a few degrees as it tends to limit the utility of the device and make it less steady and serviceable. There are other devices which have been suggested in which the frame tilts downward at a decided angle and these have the disadvantage when the bucket is thrust into the material of tending to lift the rear wheels from the ground reducing the traction. With the present device, substantially the full traction of the wheels is obtained because the thrust is parallel with the ground and there is little tendency for the back end of the tractor to be raised. On the other hand, the slight tilt permits digging into substantially level ground where this is desired. By pivoting the bucket at a point above the mid-vertical line, this can be accomplished readily. By placing the pivot point above and in front of the center of gravity, the bucket becomes self-cocking and eliminates the need for a cocking attachment.

Attached to the side members 16 and 17 are two bearings 36 and 37 in which is journaled a pipe 38. The pipe 38 is held in place by collars at each end of pipe 38, these being inside of the bearings and rigidly attached to the pipe in order to hold it in place. Attached to one of the collars is an arm 39 to which spring 40 is attached at one end and the other end of the spring being attached to the frame 17. A trip rope 41 is attached to the top of arm 39 and extends to a position which can be conveniently reached by the operator from the driver's seat. Intermediate the length of pipe 38 is a collar 42 which may be keyed or otherwise rigidly attached to the pipe 38. Arm 43 extends upward from this collar and when the trip is in position to hold the bucket in position for loading, arm 43 tilts forward. Pivotally attached to the arm 43 is a link 44 which is also pivotally attached at its other end to member 45. Attached to the front of member 45 is a lip 46 which engages a block 47 attached to the angle 35 on the back of bucket 27 when the bucket is cocked for loading or to raise a load. Member 45 has a slot 48 in it through which a spring bolt 49 having a compression spring 50 extends. Member 45 is pivoted at point 51 to a member 52 which is welded to member 21. Extending upward from member 52 is an arm 53 through which spring bolt 49 extends and to which it is bolted. When the bucket is in loading position, i. e., cocked, member 45 is in a substantially upright position being held there by spring 50. When rope 41 is pulled, arm 39 moves toward the rear and this causes pipe 38 to pivot in a counter-clockwise direction. Arm 43 then pulls on link 44 which in turn pulls member 45 backward thus raising member 46 from contact with block 47. The weight of the material on the teeth of bucket 27 causes it to tilt forward pivoting around points 25 and 26 and the material drops out of the bucket. The pivot point 25, is positioned forward and above the center of gravity of the bucket so that as soon as the load clears the teeth, the bucket immediately snaps into the leading position. The operator having released the tension on line 41, the trip is in position to hold the bucket firmly for the next loading and lifting operation.

The boom 54 comprises an A-shaped frame having a sheave 55 bearing on cross member 56. The cable 24 passes from the forward portion of frame 10 over the sheave and down to a drum 57 upon which it is wound. This is illustrated in Figure 4. The hoist as illustrated has a pulley 58 attached to a shaft 59 upon which is a clutch assembly 60 which may be of any suitable conventional design. Also associated with the shaft and free to rotate thereon, is a brake 61 which may be a drum having a brake band around it, also of conventional design. A gear system composed of a train of gears 62, 63, 73, 74, 75 and 76 may drive the cable drum 57 which is associated with a shaft 64. Clutch lever 65 also may be used to manipulate the brake. The clutch lever is operated by means of a rod 66 having a shaft lever 67 near the driver's seat and being suitably supported on the tractor. A pivoted link 77 transmits lateral motion to arm 65 thus operating the clutch. Any suitable type of hoist system may be used including a worm, chain hoist, etc. In certain cases a double acting clutch would be needed to permit the bucket to fall. The pulley 58 is driven by belt 68 which passes from the belt drive 69 of the tractor.

When pulley 58 is revolved, shaft 59 idles unless the clutch is engaged, at which time the brake drum and sleeve 78 are revolved since they are attached to the driven clutch member. When the driving member of the clutch engages it causes the brake and gears to revolve. Gear 62 is keyed to sleeve 78 and revolves, in turn revolving gear 63 with which it is meshed. Gear 63 revolves gear 72 which is attached to it, and this drives gear 74 which meshes with gear 73. Gear 75 attached to gear 74 drives gear 76 with which it is meshed. In this particular arrangement the cable drum 57 is driven by gear 76. This gear train increases the power of the lift, reduces speed to a desired rate and aids in braking the bucket as it is lowered.

Between the A-shaped members of boom 54 is a bottom cross piece 55 which may be a pipe and may rest in stirrups 79 on the front of the tractor. In the Allis-Chalmers tractor these stirrups, of which there are two, are used for attaching cultivating tools and other implements. In other types of tractors it is necessary to attach the stirrups by means of a fitting which may be bolted to the frame. The exact design of the fitting will vary somewhat with the different tractors. However the stirrups should be above the level of the frame and should be of such a design that the bottom of the boom slips in and out easily.

From the point near the top of the boom, a pair of braces 70 extend rearwardly and may attach to the frame of the tractor for example at 71. These may be adjustable so as to vary the angle at which the boom is set.

In general the position of the cross member 56 at the top of the boom should be such that a line dropped directly to the ground would clear the front of the tractor. The advantage of this is that the boom may be used for other hoisting purposes which is not possible with perpendicular booms.

The boom may be extended by having the upper portion 72 and the lower portion 73 of the frame separate with the upper part 72 slipping over the part 73. Holes may be drilled through the members at various points to permit a pin 74 to be slipped into place. This pin holds the two members in close association. Ordinarily it is undesirable to have the over all height of the boom more than approximately seven feet. In some cases, it is desired to hoist loads to a somewhat greater height in which case the extensible boom is advantageous. The boom may be braced additionally if necessary.

The length of frame 10 and the distance that the bucket extends in front of the tractor is determined in general by the height to which it is to be lifted. It should not extend further than necessary in front of the tractor because with heavy loads of which the apparatus is capable of lifting, the tendency to overturn the tractor becomes too pronounced since the leverage of a heavy load held high is too great especially on rough ground. In general the apparatus is used in connection with tractors having the small front wheels comparatively close together although it is not limited entirely to such use and provision can be made in certain instances for wide front gauge tractors by putting a yoke in members 16 and 17 over the front axle. This is particularly adapted to light weight tractors.

In operation the front of frame 10 is lowered by releasing the brake 61 and permitting the bucket 27 to drop to the ground. The exact position of the bucket can be determined at will by raising or lowering it slightly. In normal operation for picking up material which is piled on the ground, the bucket is held 1-4 inches above the ground by means of cable 24. The tractor is then driven forward and the bucket is thrust into or under the material that is to be loaded. When the bucket has been thrust to the farthest forward point possible, the clutch 60 is engaged by means of gear shaft lever 61 which is arranged to release the brake at the same time. The belt pulley 69, belt 68 and pulley 58 are rotating continuously and as soon as the clutch is engaged, power is transmitted to gear train causing drum 57 to rotate thus winding the cable 24 on it and raising the bucket and the front end of frame 10.

During the loading operation, the entire thrust is taken on member 16 and 17 and hanger 11 and pin 14. During the hoisting operation a part of the load is taken by the hanger and pin 14 as well as members 16 and 17 and part is taken by boom 54.

When the bucket is first lifted, there may be a tendency for a weaving motion in the frame which assists in tearing the material loose from the pile. This is particularly advantageous when operating with heavy material like wet straw, manure and the like. The bucket and its load is pulled loose from the pile without excessive strain upon any one portion of the frame and hoist.

When the bucket has been raised to the desired height the tractor is driven to the desired point with the bucket directly over the point at which it is to be emptied. This for example may be a manure spreader or a truck. The operator then jerks trip rope 41 which releases the trip and the weight of the material 72 in the bucket causes it to tilt forward and empty itself. Because of the position of pivots 25 and 26 the bucket immediately snaps back into position for loading and is held there by the trip. The operator releases the brake and the bucket drops downward to the loading position. By this system the bucket can be raised or lowered at will to any point.

This apparatus will operate rapidly and can be made to lift any load which the tractor tires will stand. It is simple in construction and has the great advantage of being easily and quickly attached and detached from the tractor. It will be noted that it is necessary to remove only four pins to detach the entire mechanism. These are pins 14 and 71. Removal of pins 14 one on each side of the frame permits the back end of the frame to drop to the ground. Removal of pins 71 permits the boom 54 to be raised out of the stirrups 66. For most purposes the boom can be left in place while other farm implements are attached to the tractor. The operator merely drives the tractor over the frame with the front wheels in position, then raises the back of the frame and slips pins 14 into position in hanger 11 and the frame is ready to use. One man can remove the device or attach it in a few minutes, without assistance. Most loaders require a long time to install or remove and take two or more men.

If desired, a sheave may be attached to member 21 and a block with a hook used in place of sheave 55 so that the cable can be slipped around the sheave associated with member 21 and hooked to the hook at the top of the boom thereby reducing the speed of the lift by half and increasing the power by a factor of two. In this way the apparatus can be used for extremely heavy loads and yet using an even simpler hoist arrangement than that shown thus providing a rapid action when the lighter loads are to be handled and a slower action when heavy loads are used. In actual operation this loader has been used at a much faster rate than hydraulic loaders, etc., heretofore known. It is also more rapid to operate than devices which have vertical tracks for the bucket to follow.

The fact that the bucket is self-cocking also improves and speeds up the operation.

It has an additional advantage that it is of simple construction and requires no parts which must be carefully machined. The clutch mechanism must be rugged but can be of simple construction such as a cone clutch or a finger type clutch. The brake is a simple drum and brake band which usually need not even be lined. The frame and hoist may be of welded construction and requires no fine machine work. The cable drum and gears can be cast. The bucket for the most part is made of sheet steel and the teeth of angle iron, T-iron, rods or pipe. In general, if anything breaks, it can be repaired by any welder. In the case of other loaders such as the hydraulic loader, the oil drums, etc., must be honed and machined to fine tolerances and if anything goes wrong with the adjustment, it requires the services of a skilled mechanic. This is not true with the present device. Attachments can be made for replacing the bucket with a blade to perform light grading operations, as a snow plow, etc. For example a grading blade may be attached to the ends of the frame 10. The plate should preferably be no wider than the tractor and should not be used, in general, for extremely heavy services. It is useful for most purposes around the farm such as loading manure, gravel, lime, stone, etc., grading roads, digging ditches, etc.

It can also be used to set posts, pull posts, stumps, etc., and to set, load or unload machinery or other heavy objects. For such purposes it has advantages over other types of loaders on the market, such as the hydraulic type, in that the object can be raised and lowered small distances at will in order to manipulate the load into position. The hydraulic loaders on the market drop suddenly when released and can only be stopped with difficulty, if at all. The result as poor control and damage to parts. The present invention is not subject to such disadvantages.

The hoist arrangement may comprise one or more sets of V-belt pulleys which may also be arranged so as to give the requisite amount of speed reduction. The V-belt pulleys may be arranged so as to both drive the hoist and to serve as the clutch by which the drive is operated.

Because the boom is comparatively low, the device can be driven directly into a barn and yet because of the construction, the material in the bucket can be raised sufficiently high so that it will load most trucks and wagons.

I claim as my invention:

1. In a tractor attached front end loader comprising a hoist and a swingable bucket supporting boom pivotally mounted to the tractor, the improvement which comprises braced lateral members rigidly joining said boom adjacent the front and adjacent the rear thereof, and having angularly disposed secondary stiffeners adjacent the four corners of the rectangle thus formed to give it further rigidity.

2. In a material loader for a tractor comprising a hoist, a vertically swingable boom comprising longitudinal members pivoted beneath the body of the tractor, said longitudinal members being swingable on either side of the tractor and having bucket suspending means at one end of the boom, the improved boom construction comprising a pair of lateral, substantially horizontal bracing members rigidly joining said longitudinal members to form a rigid rectangle, one of said lateral members being adjacent the pivot point of the boom, and the other being rearward and adjacent to the bucket suspending means, but being positioned so as to clear the front end of the tractor when the bucket is raised and lowered.

3. In a material loader for a tractor a hoist, said hoist comprising a substantially vertical frame narrower at the top than at the bottom, brackets for supporting said frame, operative hoisting means attached to said frame including driving means operatively associated with a driven pulley on the tractor, a vertical swinging boom operatively associated to be raised and lowered by said hoist means, said swingable boom comprising longitudinal members pivoted beneath the body of the tractor, longitudinal members being swingable on either side of the tractor and having bucket suspending means at one end of the boom, the improved boom construction comprising a pair of lateral, substantially horizontal bracing members rigidly joining said longitudinal members to form a rigid rectangle, one of said lateral members being adjacent the pivot point of the boom, and the other being rearward and adjacent to the bucket suspending means, but being positioned so as to clear the front end of the tractor when the bucket is raised and lowered.

ROBERT T. MOUDY.

REFERENCES CITED

The following references are of record in the file of this patent:

UNITED STATES PATENTS

| Number | Name | Date |
|---|---|---|
| 1,718,444 | Werthman | June 25, 1929 |
| 1,799,710 | Strom et al. | Apr. 7, 1931 |
| 1,856,629 | Geister | May 3, 1932 |
| 2,190,164 | Seyller | Feb. 13, 1940 |
| 2,242,860 | Huelle | May 20, 1941 |
| 2,269,917 | Repplinger | Jan. 13, 1942 |
| 2,287,152 | Waldecker | June 23, 1942 |
| 2,379,523 | Henry | July 3, 1945 |
| 2,396,107 | Lessmann | Mar. 5, 1946 |